United States Patent Office 3,011,951
Patented Dec. 5, 1961

3,011,951
PREPARATION OF 11α,17α-DIHYDROXY-PROGESTERONE
Herbert C. Murray, Barry Township, Barry County, and Lester M. Reineke, Portage Township, Kalamazoo County, Mich., assignors to The Upjohn Company, Kalamazoo, Mich., a corporation of Delaware
No Drawing. Filed Nov. 23, 1960, Ser. No. 71,167
10 Claims. (Cl. 195—51)

The present invention relates to a novel process for the oxidation of steroids, and more particularly to 17α-hydroxylation of 11α-hydroxyprogesterone. The process of the present invention comprises subjecting 11α-hydroxyprogesterone to the oxygenating activity of the fungus *Sepedonium ampullosporum* to introduce a 17α-hydroxy group.

Culture of the fungus, in accordance with this invention, is in or on a medium favorable to the development of the fungus. Solid media may be utilized, but the preferred media are those which permit quantity growth under aerobic conditions. Moist solid particulate media, such as bran, cereal grains, cereal grits, wood chips, shavings, sawdust, cornhusks, fibrous material, such as copra, chestnuts, or lupine seeds may be used. These can be extracted with alcohol, ether or other organic solvents, to remove objectionable contaminants and growth inhibitors prior to fermentation. The carriers may optionally contain added growth factors and nutrients and may be used in layers or trays with or without auxiliary aeration, in towers as in the vinegar process or under conditions of agitation as for example by tumbling in a rotating drum. Liquid media, illustratively brewer's wort, are well adapted to use under aerobic layer or more especially aerobic submerged fermentation conditions. Suitably the media should contain sources of available carbon, nitrogen and minerals although of course there can be significant growth and development under less than optimum conditions.

Available carbon may be from carbohydrates, starches, gelatinized starches, dextrin, sugars, molasses as of cane, beet and sorghum, dextrose, glucose, fructose, mannose, galactose, maltose, sucrose, lactose, pentoses, amino acids, peptones or proteins. Carbon dioxide, glycerol, alcohols, acetic acid, sodium acetate, citric acid, sodium citrate, lower fatty acids, higher fatty acids, or fats are illustrative of other materials which provide assimilable carbon for the energy requirements of the fungus. Mixtures of various carbon sources are sometimes advantageous.

Nitrogen in assimilable form can be provided by soluble or insoluble vegetable or animal proteins, soybean meal, lactalbumin, casein, egg albumin, peptones, polypeptides or amino acids, urea, ammonium salts, ammonia trapped on base exchange resins or on zeolites, ammonium chloride, sodium nitrate, potassium nitrate, or morpholine. Whey, distillers solubles, corn steep liquor, or yeast extract have been useful.

As mineral constituents the media or menstruum can contain, naturally present or added, available aluminum, calcium, chromium, cobalt, copper, gallium, iron, magnesium, molybdenum, potassium, scandium, uranium and vanadium. Sulfur can be provided by sulfates, alkyl sulfonates, sulfoxylates, sulfamates, sulfinates, free sulfur, hyposulfite, persulfate, thiosulfate, methionine, cystine, cystein, thiamin or biotin. Phosphorus, preferably pentavalent, suitably in a concentration at or about 0.001 to 0.07 molar and particularly at or about 0.015 to 0.02, can be present, suitably as ortho-, meta-, of pyrophosphates, salts or esters, phytin, phytic acid, phytates, glycerophosphate, sodium nucleinate, and/or corn steep liquor, casein or ovovitellin. Boron, iodine and selenium in traces may be advantageous. Desirably boron, in the form of boric acid or sodium borate can be present or added especially after germination and early growth of the fungus.

Other accessory growth factors, vitamins, auxins and growth stimulants can be provided as needed or desired.

While solid or liquid media can be utilized, a liquid medium is preferred as it favors mycelial growth.

Suspending or mycelial carriers such a filter earths, filter aids, finely divided cellulose, wood chips, bentonite, calcium carbonate, magnesium carbonate, charcoal, activated carbon or other suspendable solid matter, methyl cellulose, carboxymethyl cellulose or alginates can be added to facilitate fermentation, aeration and filtration.

Any suitable strain of *Sepedonium ampullosporum* can be used in the practice of this invention. It will be illustrated below with an example employing a particular strain which we prefer.

The fungus is grown on a medium suitably containing assimilable non-steroidal carbon, illustratively carbohydrates, such as sugar or starches; assimilable nitrogen, illustratively soluble or insoluble proteins, peptones or amino acids; and mineral constituents, illustratively phosphates and magnesium sulfate; and other art recognized, desirable additions. The medium can desirably have a pH before inoculation of between about 4 to 7 although a higher or lower pH may be used. A pH of between about 4 and 5 is preferred for the growth of *Sepedonium ampullosporum*.

Inoculation of the fungal growth-supporting medium with *Sepedonium ampullosporum* can be accomplished in any suitable manner. *Sepedonium ampullosporum* grows over a range from about 20 to about 38° C., with a temperature between about 25 to about 35° C. preferred.

The developmental period of fungal growth required before the steroid to be fermented is exposed to the fungus does not appear to be critical. For example, the steroid can be added either before thermal or other sterilization of the medium, at the time of inoculating the medium with *Sepedonium ampullosporum*, or at some time, for example, 24 or 48 hours, later. The steroid to be fermented can be added at any suitable concentration although for practical reasons steroid substrate at a concentration of about or up to about 0.6 gram per liter or even 0.8 gram per liter of medium is satisfactory and two grams per liter is operative although higher concentration, depending on the particular steroid, can be used with some inhibition of mycelial development. The addition of steroid substrate to be fermented can be accomplished in any suitable manner especially so as to promote a large surface of contact of the steroid substrate with the fungus, such as by dispersing the steroid substrate, either alone, with a dispersing agent, or in solution in an organic solvent by mixing or homogenizing a steroid substrate with a fungal medium to form a suspension or dispersion of steroid. Either submerged or surface culture procedures can be used with facility, although submerged culture is preferred. Alternatively, steroid fermenting enzymes of a growth of the fungus can be separated from the fungus or medium, admixed with the steroid or a solution or dispersion thereof, and the mixture subjected to aerobic conditions to accomplish fermentation of the steroid.

The temperature during the period of fermentation of the steroid can be the same as that found suitable for fungal growth. It need be maintained only within such range as supports life, active growth, or the enzyme activity of the fungus.

While any form of aerobic incubation is satisfactory for the growth of the selected fungus and fermentation of the steroid substrate, the efficiency of steroid fermentation is related to aeration. Therefore, aeration is usually controlled, as by agitation and/or blowing air through the fermentation medium. Aeration may be effected by surface culture or under submerged fermentation conditions. Aerobic conditions include not only the use of air to introduce oxygen, but also other sources or mixtures containing oxygen in free or liberatable form. In using air as the aerating medium, a desirable rate of aeration is about 4 to 20 millimoles and particularly about 6 millimoles of oxygen per hour per liter as determined by the method of Cooper, Fernstrom and Miller, Ind. Eng. Chem. 36, 504 (1944). Aeration is suitably modified by using superatmospheric or subatmospheric pressures, for example, 30 pounds per square inch or 10 pounds per square inch absolute. Oxygen uptake may be facilitated by the presence of various agents such as ascorbic acid, glutamic acid, citric acid, lactic acid, tyrosine, or tryptophane.

The time required for the fermentation of steroid varies somewhat with the procedure. When the steroid substrate is present at the time of inoculation of the medium, periods of from 8 to 72 hours may be used. However, when the steroid is added to the fungus, after substantial aerobic growth of the fungal organism, for example, after 16 to 24 hours at optimum temperature, the conversion of steroid substrate begins immediately and high yields are obtained in from 1 to 72 hours, 48 hours being generally satisfactory.

After completion of the steroid fermentation, the resulting fermented steroid is recovered from the fermentation reaction mixture. An especially advantageous manner of recovering the fermented steroid involved extracting the fermentation reaction mixture, including the fermentation liquor and mycelia with a water-immiscible organic solvent for steroids, for example, methylene chloride, chloroform, carbon tetrachloride, ethylene chloride, trichloroethylene, ether, amyl acetate, benzene, and the like. The fermentation liquor and mycelia may be separated and then separately extracted with suitable solvents. The mycelia may be extracted with either water miscible or water-immiscible solvents, acetone being effective. The fermentation liquor, freed of mycelia, may be extracted with water-immiscible solvents. The extracts can be combined, either before or after washing with an alkaline solution, illustratively sodium bicarbonate; suitably dried, as for example over anhydrous sodium sulfate; and the purified fermented steroid obtained by recrystallization from organic solvents or by chromatography to isolate 11α,17α-dihydroxyprogesterone.

The foregoing is a description of the culture of the fungus in a culture medium favorable to its development. We have discovered that Sepedonium ampullosporum possesses the ability to oxygenate 11α-hydroxyprogesterone to introduce a 17α-hydroxy group by virtue of associated oxygenating activity which is probably enzymatic in character. This activity is associated with the hyphal mass or with the spores, and the described 17α-oxygenation can be accomplished by contacting culture medium, the hyphal mass, or spores with 11α-hydroxyprogesterone.

According to this aspect of the invention, the fungus can be cultured as described above and the hyphal mass or spores can be separated from the fungal growth-supporting medium, according to procedures well-known in the art. The hyphal mass or spores are then resuspended in tap water, buffered distilled water or other suitable menstruum, and brought into contact, under aerobic conditions, with 11α-hydroxyprogesterone to produce 11α,17α-dihydroxyprogesterone.

The following example is illustrative of the process and product of the invention.

*Example.—11α,17α-dihydroxyprogesterone*

A medium was prepared of 20 g. of cornsteep liquor (60% solids) and 10 g. of commercial dextrose, diluted to 1 l. and adjusted to a pH between 4.8 and 5. 10 ml. of lard oil was added as an antifoam preventive. 10 l. of this sterilized medium was inoculated with a 72-hour vegetative growth of Sepedonium ampullosporum [Damon, Mycologia, vol. 44, pages 86–96 (1952)], a culture of which is available from the Northern Utilization Research and Development Division, Peoria, Illinois, having been assigned the numerical designation NRRL 2877, or from the Centraalbureau voor Schimmelcultures, Baarn, Holland, and incubated for 48 hours at a temperature of about 28° C. using a rate of aeration of 0.3 l. per minute at 300 r.p.m. After 48 hours of agitation, a solution of 2.0 g. of 11α-hydroxyprogesterone in 20 ml. of dimethylformamide was added to the inoculated medium. After an additional 48-hour period of incubation, the beer and mycelium were separated by filtration. The mycelium was washed with water and the washwater was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue which was dissolved in about 25 ml. of methylene chloride and poured onto a column of Florisil (synthetic magnesium silicate) 3.3 cm. in diameter and 35 cm. high. The column was developed by eluting with 335 ml. portions (except as otherwise indicated) of solvents and the eluate fractions were evaporated to dryness and the weight of the residue of each fraction determined, as shown in Table I.

TABLE I

| Fraction | Solvent | Weight of Residue |
| --- | --- | --- |
| 1 | Commercial hexanes (1 liter) | 221 mg., oily. |
| 2 | 5% Acetone in Commercial hexanes. | 0. |
| 3 | ——do—— | 312 mg., oily. |
| 4 | ——do—— | 78 mg., oily. |
| 5 | 10% Acetone in Commercial hexanes. | 31 mg., oily. |
| 6 | ——do—— | 89 mg., oily. |
| 7 | ——do—— | 85 mg., oily. |
| 8 | ——do—— | 15 mg. |
| 9 | ——do—— | 12 mg. |
| 10 | ——do—— | 10 mg. |
| 11 | ——do—— | 47 mg. |
| 12 | ——do—— | 527 mg. ⎫ 11α, 17α-dihydroxyprogesterone. |
| 13 | ——do—— | 385 mg. ⎬ |
| 14 | ——do—— | 64 mg. ⎭ |
| 15 | ——do—— | 30 mg. |
| 16 | ——do—— | 10 mg. |
| 17 | Acetone | 305 mg. |
| 18 | ——do—— | 140 mg. |
| 19 | ——do—— | 11 mg. |

Fractions 12, 13 and 14 of the chromatogram were combined and recrystallized from acetone-commercial hexanes to give 0.56 g. of 11α,17α-dihydroxyprogesterone having a melting point of 210–214° C. and $$\lambda_{max.}^{EtOH} \ 242 \ m\mu, \ \epsilon 15{,}700$$

The infrared spectrum was the same as that of an authentic sample of 11α,17α-dihydroxyprogesterone.

We claim:

1. A process for producing 11α,17α-dihydroxyprogesterone which comprises aerobically subjecting 11α-hydroxyprogesterone to the oxygenating activity of *Sepedonium ampullosporum*.

2. A process for the production of 11α,17α-dihydroxyprogesterone which comprises aerobically contacting 11α-hydroxyprogesterone with *Sepedonium ampullosporum*.

3. A process for the production of 11α,17α-dihydroxyprogesterone which comprises contacting 11α-hydroxyprogesterone under aerobic conditions in the presence of a nutrient medium with *Sepedonium ampullosporum*.

4. A process for the production of 11α,17α-dihydroxyprogesterone which comprises growing *Sepedonium ampullosporum* under aerobic conditions in the presence of a nutrient medium and 11α-hydroxyprogesterone.

5. A process for the production of 11α,17α-dihydroxyprogesterone which comprises growing *Sepedonium ampullosporum* under aerobic conditions, in the presence of a nutrient medium containing assimilable non-steroidal carbon and 11α-hydroxyprogesterone and recovering the resulting 11α,17α-dihydroxyprogesterone.

6. A process for the production of 11α,17α-dihydroxyprogesterone which comprises growing *Sepedonium ampullosporum* under aerobic conditions with agitation in the presence of a nutrient medium containing assimilable carbohydrate, nitrogen and phosphorus and 11α-hydroxyprogesterone and recovering 11α,17α-dihydroxyprogesterone.

7. A process for the production of 11α,17α-dihydroxyprogesterone which comprises growing *Sepedonium ampullosporum* under aerobic conditions and with agitation in the presence of a nutrient medium containing assimilable carbohydrate, nitrogen, phosphorus and 11α-hydroxyprogesterone and separating the thus-produced 11α,17α-dihydroxyprogesterone.

8. A process for the production of 11α,17α-dihydroxyprogesterone which comprises growing *Sepedonium ampullosporum* under aerobic, submerged conditions in the presence of a nutrient medium containing assimilable carbohydrate, nitrogen, and phosphorus and 11α-hydroxyprogesterone and recovering the thus-produced 11α,17α-dihydroxyprogesterone.

9. A process for the production of 11α,17α-dihydroxyprogesterone which comprises growing *Sepedonium ampullosporum* under aerobic conditions, with agitation, in the presence of a nutrient medium containing assimilable non-steroidal carbon, nitrogen and phosphorus and 11α-hydroxyprogesterone and isolating the resulting 11α,17α-dihydroxyprogesterone.

10. A process for the production of 11α,17α-dihydroxyprogesterone which comprises growing *Sepedonium ampullosporum* under aerobic submerged conditions, in the presence of a nutrient medium containing assimilable carbon, nitrogen and phosphorus and 11α-hydroxyprogesterone and extracting the resulting 11α,17α-dihydroxyprogesterone.

References Cited in the file of this patent
UNITED STATES PATENTS

| | | |
|---|---|---|
| 2,925,366 | Murray et al. | Feb. 16, 1960 |
| 2,970,085 | Dulaney et al. | Jan. 31, 1961 |